United States Patent

Hanson

[15] 3,635,849

[45] Jan. 18, 1972

[54] POLYISOBUTYLENE PARAFFIN WAX AND OIL BLENDS

[72] Inventor: Alden W. Hanson, Midland, Mich.
[73] Assignee: University Patents, Inc., Chicago, Ill.
[22] Filed: Sept. 8, 1969
[21] Appl. No.: 856,150

[52] U.S. Cl. ..................260/2.5 B, 36/2.5 A, 128/595, 260/23 H, 260/27 R, 260/28.5 A
[51] Int. Cl. .................................................C08f 29/06
[58] Field of Search..................260/28.5 A, 23 H, 2.5 B; 128/595; 36/112

[56] References Cited

UNITED STATES PATENTS 3,326,834  6/1967  Signorelli et al. ..................260/28.5
3,338,855  8/1967  Kray ..................................260/28.5

Primary Examiner—Donald E. Czaja
Assistant Examiner—Donald J. Barrack
Attorney—Albert Siegel

[57] ABSTRACT

A novel composition of matter consisting essentially of from about 5 percent to about 45 percent of a polyolefin, particularly polyisobutylene, which has a molecular weight greater than 120,000, from about 15 percent to about 70 percent of a paraffin having a melting point between 40° C. and 100° C. and from about 5 percent to about 80 percent oil with or without minor diluents or other constituents. Composition is characterized by inertia to instantaneous pressure, conformance upon application of pressure and resistance to sag, as well as having cold flow characteristics to a resistance of gravity plus about 2 gms./in.$^2$ or above. Also is directed to the process of making such composition.

5 Claims, No Drawings

POLYISOBUTYLENE PARAFFIN WAX AND OIL BLENDS

BACKGROUND OF THE INVENTION

This invention relates to a new composition of matter and, more particularly, is directed to a three or more component composition having very unique properties. More particularly, this invention is directed to a mixture of polyisobutylene or other polyolefins, paraffin and oil. The use of polyisobutylene is preferred.

Because of the unique combination of properties which I find in the present materials, they offer among other uses utility for body-conforming structures, e.g., as for use in ski boots and other athletic equipment, footwear generally, as well as vibration dampening and shock-resistant materials, etc. As noted in the abstract, such materials, when made of the compositions as hereinafter taught, are characterized by inertia to instantaneous pressure, conformance upon application of continuous pressure, and absence of sag or movement unless more than a threshold pressure is applied. Another aspect of this invention is directed to the use of such novel materials as for example in body-conforming and moldable structures.

In some respects the present invention represents an improvement over my U.S. Pat. No. 3,237,319 entitled "Improved Ski Boots Having Thixotropic Material Encircling the Ankle Portion Thereof and Other Applications for Said Material" but tests have shown that the present composition represents a substantial improvement over the composition of said referenced patent.

Accordingly, a principal object of my invention is to provide a novel composition of matter consisting essentially of a polyolefin, particularly polyisobutylene, paraffin, oil and with or without various diluents and materials in particular amounts and with paraffin and polyisobutylene of particular characteristics which novel composition is characterized by lack of flow under instantaneous pressure, conformance upon application of continuous pressure, and absence of sag.

Another object of my invention is to provide a novel composition wherein to the mixture aforesaid is added lightweight aggregate materials, for example polystyrene beads or heavy aggregate such as $Fe_3O_4$.

Still another object of my invention is to provide a method of making the aforesaid compositions of matter.

These and other objects, features and advantages of my invention will become apparent to those skilled in this art from the following detailed disclosure thereof.

DESCRIPTION OF THE INVENTION AND THE PREFERRED EMBODIMENTS

I have invented a novel composition of matter which is characterized as aforesaid. In developing such materials, I have found that there are various ranges of constituents some of which are preferred and some of which are somewhat less desirable but still useful for the purposes of this invention.

For the broadest compositional standpoint the ranges of materials used herein are as follows:

| Constituent | Weight Percent |
| --- | --- |
| Polyisobutylene (M.W. greater 120,000) | 5% to 45% |
| Paraffin (M.P., °C.: 40°–100°) | 15% to 70% |
| Oil | 5% to 80% |

Within such broad range I have found somewhat better materials in the following range and such represents the preferred composition hereof:

| Constituent | Weight Percent |
| --- | --- |
| Polyisobutylene (M.W. greater 150,000) | 13% to 25% |
| Paraffin (M.P. °C.: 50°–80°) | 30% to 55% |
| Oil | Balance |

The preferred material is primarily polyisobutylene. Preferably such polyisobutylene has a molecular weight initially of around 200,000 and upon mixing with the other constituents hereof does not break down to less than 150,000 although it is still useful for present purposes, but somewhat less desirable, at molecular weights as low as 120,000. Such high molecular weight polyisobutylenes are commercially available.

Similarly, the paraffins for use herewith are commercially available.

A broad range of oils, the third constituent, may be used, including both the saturated and unsaturated varieties. Representative of such oils are peanut oil, tall oil, lubricating oils, neat's-foot oil, neutral blending stock and others. In some instances, as illustrated in the examples set forth below at least two different oils are used in the same composition.

In making the present compositions, the polyisobutylene is first worked. This is desirable, in fact highly preferred in order to make the polyisobutylene more receptive to the other constituents of the finished composition. The high molecular weight polyisobutylene that is used in this invention normally comes in the form of relatively thick (around one-half inch) sheet stock that is relatively tough and somewhat difficult to mechanically work. I find, however, that it is readily formed into somewhat crumbled, meshlike sheets which adapts it to receive the paraffin.

The worked high molecular polyisobutylene material is then mixed with molten paraffin and maintained in an oven for an adequate time and at a temperature of around 220° F. to permit the paraffin to enter into the now opened structure of the polyisobutylene. The amount of time that the paraffin and polyisobutylene remain in the oven is dependent on the characteristics of the final product desired, the molecular weight of the polyisobutylene, the particle size of the polyisobutylene, the molecular weight of the paraffin and the like. Generally speaking, the mixture will remain in the oven long enough to see all of the paraffin melted and reasonably mixed with the polyisobutylene, and may be as short as one-half hour and as long as 5 days or longer. The two-component mixture is then removed from the oven and while the paraffin is still in the molten state the oil and other constituents are blended into the finished mix and then well blended as by mixing or the like. Normally, mixing occurs for about a half hour to yield the desirable end product of this invention.

A few specific examples of compositions used herewith using worked polyisobutylene, 200,000 molecular weight, paraffin having a melting point of 66° C. and which were blended in with oil and other constituents, optionally, are as follows:

| Constituent | EXAMPLE 1 Grams | Percent by Weight |
| --- | --- | --- |
| Polyisobutylene | 400 | 23.46% |
| Paraffin | 800 | 46.92% |
| Oil, Bright Stock | 50 | 2.93% |
| Tall Oil | 331 | 19.41% |
| Neat's-Foot Oil | 124 | 7.27% |

| EXAMPLE 2 | | |
| --- | --- | --- |
| Polyisobutylene | 178.72 | 21.53% |
| Paraffin | 357.44 | 43.06% |
| Oil, SAE 40 Bright Stock | 22.32 | 2.69% |
| Safflower Oil | 69.04 | 8.24% |
| Neat+-Foot Oil | 55.36 | 6.67% |
| Tall Oil | 147.84 | 17.81% |

| EXAMPLE 3 | | |
| --- | --- | --- |
| Polyisobutylene | 234.6 | 22.34% |
| Paraffin | 469.2 | 44.68% |
| Oil, Bright Stock* | 29.3 | 2.79% |
| Tall Oil | 194.2 | 18.48% |

| | | |
|---|---|---|
| Neat's-Foot Oil | 72.7 | 6.92% |
| Safflower Oil | 50.0 | 4.76% |
| R Industrial H-1 5, Standard Oil of Indiana | | |

EXAMPLE 4

| | | |
|---|---|---|
| Polyisobutylene | 400 | 21.5% |
| Paraffin | 800 | 43.0% |
| Peanut Oil | 600 | 32.0% |
| Oil, Bright Stock | 60 | 3.5% |

EXAMPLE 5

| | | |
|---|---|---|
| Polyisobutylene | 843 | 21.5% |
| Paraffin | 966 | 42.9% |
| Neutral Blending Oil | 250 | 11.11% |
| Tall Oil | 400 | 17.77% |
| Nest's-Foot Oil 300 T. Saybolt | 150 | 6.66% |

In making the present materials I find that it is preferred to use polyisobutylene of a molecular weight of around 200,000. Higher molecular weight material may also be used but at the other extreme I find that one should have a molecular weight of at least 120,000. Most of the truly useful materials that I have formulated employ polyisobutylene having molecular weights ranging from 150,000 to 200,000.

I find that I obtain excellent compositions when I employ paraffin melting at 66° C. Actually, the preferred amount to use herein ranges between 30 and 55 percent by weight.

I also find that it is preferred to employ, within the ranges set out above, amounts of polyisobutylene and paraffin whereby the ratio of paraffin to polyisobutylene ranges between 1.5 and 2.5 to 1.

The three-component composition, i.e., polyisobutylene, paraffin and oil, has a density of slightly less than 1. For many uses, such a density is acceptable. However, for certain uses as for example a body-conforming pad in a ski boot where light weight is desired, I mix high-bulk material with the basic composition aforesaid. One may readily blend, for example, a considerable volume of expanded polystyrene beads into bast material to provide a lightweight material yet not depart from its principal characteristics. The polystyrene beads form a discontinuous phase in the continuous principal phase and may be present up to 10 percent by weight or up to around 80 percent by volume.

The oil component hereof may be varied, if desired. Flexible polyvinyl chloride materials contain very high percentages of plasticizers, sometimes up to 50 percent or more. The oils in the compositions of the present invention have been found to penetrate such polyvinyl chloride formulations and to dilute and/or extract some of the plasticizer. By substitution of a suitable plasticizer for a portion of the oil, say up to 30–35 percent, an undesirable effect of hardening polyvinyl chloride compositions can be avoided. It is necessary to test each plasticizer to find the level which will prevent the stiffening and hardening of the vinyl chloride sheet.

Plasticizers used for vinyl chloride are dibutyl phthalate, dioctyl phthalate, chlorinated polyethylene, triphenyl phosphate, tricresyl phosphate, and the like.

It will be understood that various modifications and variations may be effected without departing from the spirit or scope of the novel concepts of my invention.

I claim as my invention:

1. A novel composition of matter consisting essentially of:
   a. from about 5 to 45 percent, by weight, polyisobutylene having a molecular weight greater than 120,000;
   b. from 15 to 70 percent, by weight, paraffin having a melting point between 40° and 100° C., wherein there is more paraffin than polyisobutylene; and
   c. from about 5 to 80 percent, by weight, of at least one oil selected from the group consisting of peanut oil, tall oil, lubricating oil, neutral blending stock, safflower oil and neat's-foot oil,
   which composition is characterized by resistance to instantaneous pressures, conformance upon application of continuous pressure and resistance to sag.

2. The composition as defined in claim 1 wherein lightweight aggregate is added thereto.

3. The composition as defined in claim 2 wherein said lightweight aggregate consists of expanded polystyrene.

4. The composition as defined in claim 1 wherein:
   a. the polyisobutylene has a molecular weight greater than 150,000 and is present in amounts ranging from 13 to 25 percent,
   b. the paraffin has a melting point ranging between 50° and 80° C. and is present in amounts ranging from 30 to 55 percent; and
   c. the ratio of paraffin content to polyisobutylene content ranges between 1.5 and 2.5 to 1.

5. The process of making a material as defined in claim 1 which comprises the steps of:
   a. working the polyisobutylene;
   b. combining the polyisobutylene with molten paraffin and holding the two-component mix at a temperature of around 190° to 225° F. for around at least 120 hours;
   c. adding oil to the aforesaid mix and blending the constituents.

* * * * *